US011122409B2

(12) United States Patent
Garg

(10) Patent No.: US 11,122,409 B2
(45) Date of Patent: *Sep. 14, 2021

(54) DETECTING SAFETY CONCERNS VIA SUBSCRIBER SAFETY CONTROL (SSC) SYSTEM

(71) Applicant: T-Mobile USA, Inc., Bellevue, WA (US)

(72) Inventor: Parag Garg, Woodinville, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,941

(22) Filed: Dec. 23, 2019

(65) Prior Publication Data

US 2020/0137546 A1    Apr. 30, 2020

Related U.S. Application Data

(63) Continuation of application No. 16/215,490, filed on Dec. 10, 2018, now Pat. No. 10,542,407.

(Continued)

(51) Int. Cl.
*H04W 4/90* (2018.01)
*H04L 29/08* (2006.01)
(Continued)

(52) U.S. Cl.
CPC .............. *H04W 4/90* (2018.02); *G10L 17/00* (2013.01); *G10L 17/06* (2013.01); *H04L 67/18* (2013.01);
(Continued)

(58) Field of Classification Search
CPC ....... H04W 12/03; H04W 12/08; H04W 4/02; H04W 4/021; H04W 4/08; H04W 4/21;
(Continued)

(56) References Cited

U.S. PATENT DOCUMENTS 6,574,605 B1 * 6/2003 Sanders ......... G06Q 10/063112
705/7.26
8,990,329 B1 * 3/2015 Khvostichenko .. G06Q 10/1095
709/206

(Continued)

OTHER PUBLICATIONS

U.S. Appl. No. 16/215,490, Non-Final Office Action dated Apr. 29, 2019, 18 pages.

(Continued)

*Primary Examiner* — Jean A Gelin
(74) *Attorney, Agent, or Firm* — Han Santos, PLLC

(57) ABSTRACT

Techniques are described that facilitate analyzing real-time communication sessions between a client device of a client account and a third-party device for the purpose of detecting safety concerns that may impact a client associated with the client device. The real-time communication sessions may include voice or text communications provisioned by a telecommunication service provider. In response to detecting a safety concern, notification data may be sent to a trusted device associated with the client account that alerts a trusted person of the inferred safety concern. In some examples, a safety concern may be inferred based on an irregular performance or non-performance of a regularly conducted real-time communication session. Moreover, communication session modification data may be sent to a client device involved in the real-time communication session for the purpose of terminating the real-time communication session based at least in part on safety concerns.

20 Claims, 7 Drawing Sheets

Related U.S. Application Data

(60) Provisional application No. 62/679,794, filed on Jun. 2, 2018.

(51) Int. Cl.
  G10L 17/06 (2013.01)
  G10L 17/00 (2013.01)

(52) U.S. Cl.
  CPC .............. *H04L 67/20* (2013.01); *H04L 67/22* (2013.01); *H04L 67/26* (2013.01); *H04L 67/303* (2013.01)

(58) Field of Classification Search
  CPC ..... H04W 4/90; H04W 64/00; H04W 64/003; H04W 8/16; H04W 72/121; H04W 4/029; H04W 24/08; H04W 68/005; H04L 67/303; H04L 67/306; H04L 67/20; H04L 67/22; H04L 67/18; H04L 67/14; H04M 1/66; H04M 1/72577
  See application file for complete search history.

(56) References Cited

U.S. PATENT DOCUMENTS

| | | | |
|---|---|---|---|
| 9,392,460 B1 | | 7/2016 | Blake et al. |
| 9,609,121 B1 * | | 3/2017 | Hodge .................... H04N 7/141 |
| 2004/0003046 A1 * | | 1/2004 | Grabelsky ............. H04L 65/608 |
| | | | 709/206 |
| 2004/0049699 A1 * | | 3/2004 | Griffith ............. H04W 12/1204 |
| | | | 726/23 |
| 2005/0246278 A1 * | | 11/2005 | Gerber ................... G06Q 20/02 |
| | | | 705/44 |
| 2006/0062376 A1 * | | 3/2006 | Pickford ............. H04M 3/5235 |
| | | | 379/265.12 |
| 2007/0143858 A1 | | 6/2007 | Hearty |
| 2008/0005325 A1 * | | 1/2008 | Wynn .................. G06Q 10/107 |
| | | | 709/225 |
| 2010/0012506 A1 | | 1/2010 | Prichystal |
| 2010/0299249 A1 | | 11/2010 | Carlson et al. |
| 2011/0093096 A1 * | | 4/2011 | Sachs ................ H04L 12/40019 |
| | | | 700/81 |
| 2013/0179491 A1 | | 7/2013 | Bennett et al. |
| 2013/0191458 A1 | | 7/2013 | Krishnan et al. |
| 2015/0026786 A1 * | | 1/2015 | Alexander ............ H04M 3/436 |
| | | | 726/7 |
| 2015/0193869 A1 * | | 7/2015 | Del Vecchio .......... G06Q 40/02 |
| | | | 705/42 |
| 2015/0200983 A1 | | 7/2015 | Pearce et al. |
| 2015/0304288 A1 | | 10/2015 | Balasaygun et al. |
| 2016/0027278 A1 * | | 1/2016 | McIntosh ........... G08B 21/0423 |
| | | | 715/741 |
| 2016/0225044 A1 | | 8/2016 | Lawson |
| 2016/0234828 A1 * | | 8/2016 | Smith ..................... H04W 4/90 |
| 2017/0070479 A1 | | 3/2017 | Menezes et al. |
| 2017/0188100 A1 | | 6/2017 | Stalker |
| 2017/0200209 A1 | | 7/2017 | Cheng et al. |
| 2017/0331821 A1 | | 11/2017 | Filippidis et al. |
| 2017/0347390 A1 | | 11/2017 | Cho et al. |
| 2018/0020028 A1 | | 1/2018 | Chang |
| 2018/0183740 A1 | | 6/2018 | Werdell et al. |
| 2018/0302450 A1 * | | 10/2018 | Nimbavikar ........ H04L 65/1076 |
| 2019/0005024 A1 | | 1/2019 | Somech et al. |
| 2019/0068594 A1 | | 2/2019 | Sarwar et al. |
| 2019/0268460 A1 * | | 8/2019 | Agrawal ............... H04W 4/021 |

OTHER PUBLICATIONS

U.S. Appl. No. 16/215,490, Notice of Allowance dated Sep. 13, 2019, 17 pages.

* cited by examiner ured to analyze a real-time communication session associ-
DETECTING SAFETY CONCERNS VIA SUBSCRIBER SAFETY CONTROL (SSC) SYSTEM

RELATED APPLICATIONS

This application claims priority to commonly owned U.S. Provisional Patent Application No. 62/679,794 filed on Jun. 2, 2018 and titled "Detecting Safety Threats via Analysis of Voice and Text Communications," and a commonly owned U.S. Non-Provisional patent application Ser. No. 16/215,490 filed on Dec. 10, 2018 and titled "Detecting Safety Concerns via Subscriber Safety Controller (SSC) System," which are herein incorporated by reference in their entirety.

BACKGROUND

Today, the use of electronic devices is widespread. These devices can improve the productivity and quality of life for users by improving accessibility to real-time communications in a variety of environmental settings, such as home, workplace, school, and/or so forth. However, such electronic devices are highly vulnerable to safety concerns by unspecified individuals that target users for unwanted or ill-intentioned purposes. Unspecified individuals may include individuals who initiate safety concerns by impersonating a known person's identity for fraudulent or ill-intentioned purposes. Further, unspecified individuals that may be deemed a safety concern may include individuals who are known to a user in a particular environmental setting (i.e. colleagues at work or school, or teammates of an extra-curricular activity), however, choose to interact with a user outside the context of that particular environmental setting. For example, it may be customary for a staff member of a child subscriber's school to initiate a real-time communication with a child during school hours or shortly thereafter in relation to after-school activities. However, that same real-time communication may be suspicious if it were to occur in a different environmental setting, such as outside of the school premises or on non-school days.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
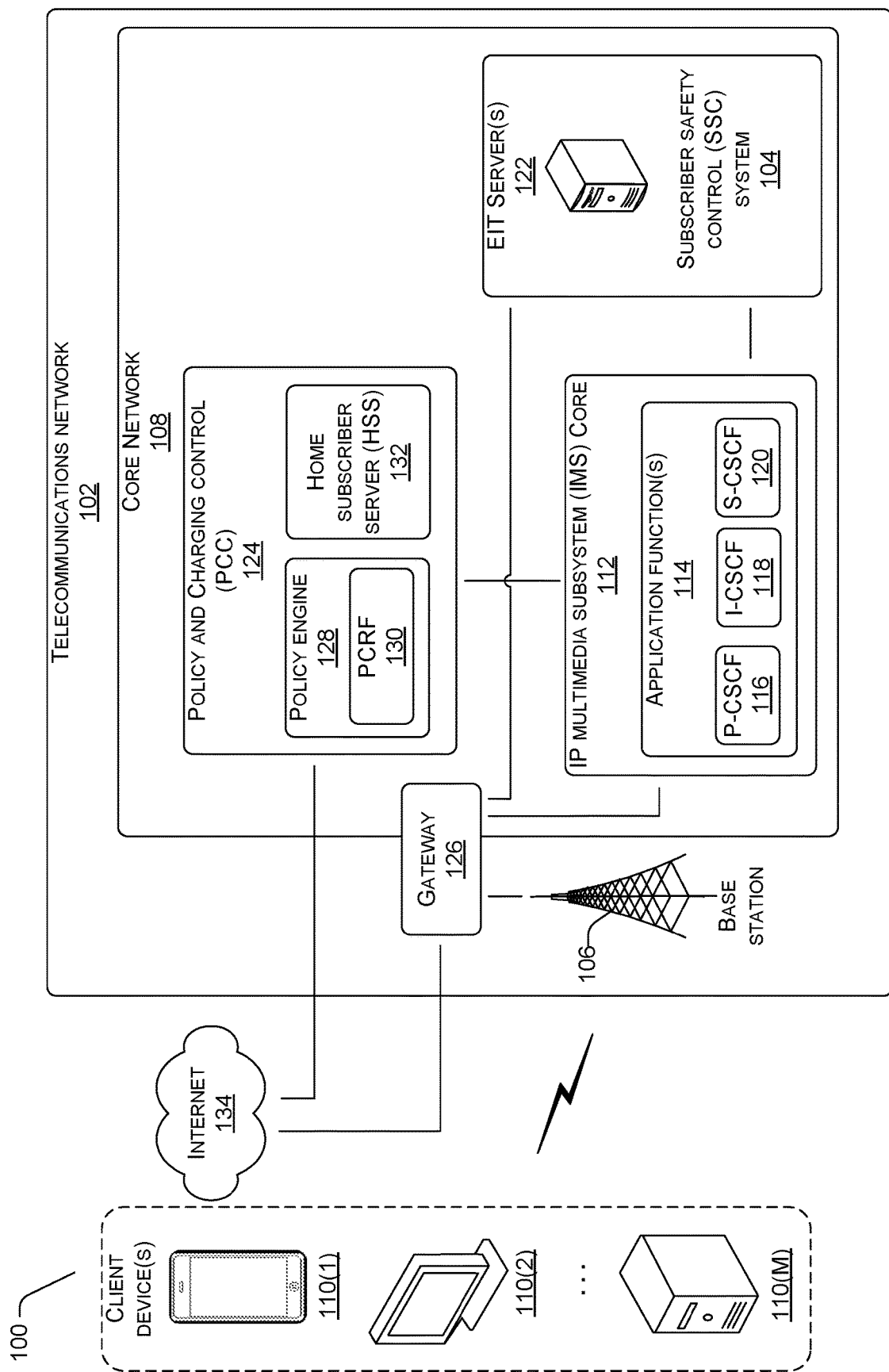
FIG. 1 illustrates a computing environment 100 of a telecommunications network 102 that facilitates a Safety Subscriber Control (SSC) system 104.

This disclosure describes techniques that facilitate analyzing real-time communication sessions to detect safety concerns that may impact an interacting client. The real-time communication sessions may involve client devices associated with a client account, such as a telecommunication service account provisioned by a telecommunication service provider. In response to detecting a safety concern, the techniques further describe generating a notification to alert another client device associated with the client account. In some examples, the notification may be sent to a Primary Account Holder (PAH) of the client account. The client account may include at least one PAH and one or more Secondary Account Holders (SAHs). A PAH, or a delegated user, may create, update, or delete access privileges that affect how SAHs interact with the telecommunication service via the client account. As described in further detail below, this may include generating and maintaining a permissible list of contacts, an impermissible list of contacts, or a grey-list of contacts for a select number of SAHs or the client account, generally.

Moreover, this disclosure describes a system, more specifically, a Subscriber Safety Control (SSC) system that can infer safety concerns associated with a real-time communication session, and further notify a trusted person based on an analysis of the safety concern. The conditions by which a real-time communication is automatically monitored, intercepted, and/or selectively terminated may be based at least in part on one or more communication rules established by a PAH of the client account or an administrator of the SSC system.

In various examples, the SSC system may selectively monitor real-time communication sessions between a client device associated with the client account and another, third-party device. Real-time communication sessions may include voice communications, text communications, or a combination of both. Monitoring may occur on a continuous basis, per a predetermined list of contacts, or in response to a triggering event. The predetermined list of contacts may include at least one of a permissible list of contacts, an impermissible list of contacts, or a grey-list of contacts. Each predetermined list of contacts may include a list of third-party devices, third-party users, or a combination of both. Each listing of a third-party device may include a corresponding third-party device identifier, such as a phone number, a Public Land Mobile Network ID (PLMN ID), a Mobile Station International Subscriber Directory Number (MSISDN), or an International Mobile Subscriber Identity (IMSI), or any combination thereof. Each listing of a third-party user may include a listing of corresponding third-party devices associated with the third-party user, and in some instances, a corresponding voice-biometric template associated with the third-party user.

It is noteworthy that the term "client," as used herein, may refer to one or more of a PAH or a SAH. Further, the term "third-party," as used herein, may refer to individuals with whom a client (i.e. PAH and/or SAH) engages in a real-time communication session.

The permissible list of contacts may include a list of third-party device that a client is permitted to engage, without restriction. The impermissible list of contacts may include a list of third-party devices and third-party users that a client is not permitted to engage in a real-time communication session. The grey-list of contacts may include third-party devices and third-party users with whom a client is permitted limited communications. By way of example, the SSC system may establish a grey-list of contacts based on one or more communications rules that limit communications based on a permissible number of minutes for voice communications over a predetermined time period (i.e. billing cycle of a telecommunication service account), a permissible number of text messages over a predetermined time period (i.e. billing cycle of a telecommunication service account), a time of day, a day of the week, a geographic location of the client at a point in time that the real-communication session was initiated, or any combination thereof.

Further, the SSC system may selectively monitor real-time communication sessions based at least in part on a triggering event, such as a time of day, a day of the week, a geographic location of the client device at a point in time that a real-time communication session is initiated, or any combination thereof. A triggering event may also include a determination that a real-time communication session has been initiated by an unknown third-party device or unknown third-party user that is not listed on any one of the predetermined lists of contacts.

During the process of monitoring the real-time communication sessions, the SSC system may retrieve communication session data from the client device of the client account. The SSC system may parse through the communication session data to generate profile data that may be used to generate a client data model for each client (i.e. PAH and SAH) and third-party that is interacting with the client. Each client data model is intended to provide a baseline client profile of nominal, non-threatening and safe, real-time communications. In some examples, the client data model may also include nominal environmental conditions ascertained from sensor data. In this way, the SSC system may monitor real-time communication sessions relative to a client data model, and in doing so, infer conduct that may be considered out of the ordinary.

In various examples, the communication session data may include audio data associated with a voice communication, text data associated with a text communication (i.e. Short Message Service (SMS), Multimedia Message Service (MMS), or a transcript of a voice communication), along with corresponding session metadata. Session metadata may include a client identifier associated with the client device, a third-party identifier associated with the third-party device that is interacting with the client device. In this example, the SSC system may analyze the session metadata to identify the client device and the third-party device. The SSC system may further use the audio data to perform a voice biometric analysis of the client voice associated with the client device and the third-party voice associated with the third-party device.

The session metadata may also include sensor data from the client device. For example, the client device may be equipped with one or more sensors such as a Global Positioning System (GPS) sensor, accelerometer sensors, proximity detection sensors, temperature sensors, hygrometer sensors, and/or so forth. In these examples, the SSC system may be configured to analyze the sensor data to determine ambient conditions that impact the client during a real-time communication session. In doing so, the SSC system may determine whether the client is impacted by an environmental safety concern. For example, the sensor data may include a geographic location (i.e. GPS sensor), movement data (i.e. accelerometer sensors and proximity sensors), temperature data (i.e. temperature sensors), humidity data (i.e. hygrometer sensors), and/or so forth.

In various examples, the SSC system may analyze the communication session data associated with a real-time communication session relative to the client data model to infer conduct or non-conduct that is determined as out of the ordinary. In this way, the SSC system may generate a subscriber safety score for the client based at least in part on an analysis of the real-time communication session. The SSC system may be further configured to automatically perform one or more actions in response to the subscriber safety score being greater than or equal to one or more predetermined safety thresholds. For example, the SSC system may determine that a subscriber safety score that is greater than a first predetermined safety threshold but less than a second predetermined safety threshold, and in doing so, transmit a notification to a client device of a PAH, or delegated user. In another example, the SSC system may determine that a subscriber safety score is greater than both the first and second predetermined safety thresholds, and in doing so, automatically terminate any ongoing real-time communication session, and establish a communicative connection between the client and a trusted person, such as the PAH.

The subscriber safety score may be alpha-numeric (i.e. 0 to 10, or A to F), descriptive (i.e. low, medium, or high), based on color, (i.e. red, yellow, or green), or any other suitable rating scale. In one example, a high subscriber safety score (i.e. 7 to 10, high, or red) may reflect an inference that the client is subject to a heightened risk of their safety. In this example, a threshold high subscriber safety score (i.e. 7, high, or red) may be akin to the second predetermined safety threshold described earlier. In another example, a medium subscriber safety score (i.e. 4 to 6, medium, or yellow) may reflect an inference that the client is subject to a medium level of risk. A medium level of risk may pertain to detecting conduct or non-conduct, or a communication that is out of the ordinary but does not pose, by itself, a safety concern. For example, the SSC system may infer a medium risk level for a real-time communication session with an unknown third-party, or in response to detecting a change in nominal environmental ambient conditions (i.e. geographic location, temperature, humidity, etc.) associated with the client device during a real-time communication session. In this example, a threshold medium subscriber safety score (i.e. 6, medium, or yellow) may be akin to the first predetermined safety threshold described earlier. In contrast, a low subscriber safety score (i.e. 0 to 3, low, or green) may indicate that analysis of the real-time communication does not flag any safety concerns.

In a first non-limiting example, the SSC system may infer a safety concern based on a voice-biometric analysis of a real-time communication session. The voice biometric analysis may include an analysis of a vocal accent, a tonality, a refraction of sound, a vocal frequency, a vocal pitch, or any combination thereof. The SSC system may compare audio data of a client's voice or third-parry's voice with registered biometric templates accessible to the SSC system. For example, the SSC system may monitor biometric voice data of a client, or third-party interacting with the client, during a real-time communication session to infer changes in frequency, pitch, or tonality that may be associated with a safety concern. Thus, with or without analyzing a transcript of voice communications, the SSC system may determine in real-time, or near real-time, that the client may be subject to a safety concern. Additionally, or alternatively, the SSC system may analyze a vocabulary used by the client and third-party to determine whether the vocabulary used constitutes a safety concern.

In a second non-limiting example, the SSC system may infer a safety concern based on an analysis of the session metadata associated with the real-time communication session. For example, the SSC system may compare the session metadata of a real-time communication session with data-points of a client data model associated with the client. The SSC system may infer a safety concern based on an irregularity associated with regularly conducted real-time communication sessions between the client and a particular third-party device or more specifically, a particular third-party. The irregularity may be associated with a time of day, a day of the week, or a duration of the real-time communication session itself.

Additionally, or alternatively, the SSC system may infer a safety concern based on a change in ambient conditions associated with regularly conducted real-time communication sessions. In this example, the SSC system may generate data-points within the client data model that define nominal ambient conditions for regularly conducted real-time communication sessions, based on historical instances of regularly conducted real-time communication sessions. Thus, the SSC system may infer a safety concern based on an irregularity (i.e. lack of correlation) between the ambient conditions of a real-time communication session and those defined by data-points of the client data model. For example, the SSC system may analyze sensor data captured by the client device to determine that a real-time ambient condition (i.e. one or more of an ambient noise, ambient temperature, or ambient humidity) is different from historical ambient conditions nominally associated with a select regularly conducted real-time communication session, as defined by the client data model. In this way, the SSC system may infer a safety concern based on the lack of correlation.

In a third non-limiting example, the SSC system may infer a safety concern based on non-performance of a regularly conducted real-time communication session. For example, a client may regularly reach out to a particular third-party at a particular time of day, a day of the week, geographic location, or any combination thereof. The SSC system may generate data-points within the client data model that define regularly conducted real-time communication sessions. In this way, the SSC system may determine that a client has failed to participate in a regularly conducted real-time communication session, as defined by the client data model, and in doing so, infer a safety concern based on non-performance.

In a fourth non-limiting example, the SSC system may infer a safety concern based on a real-time communication session being initiated by, or with, an unknown third-party device or third-party user that is not listed on any one of a permissible list of contacts, an impermissible list of contacts, or a grey-list of contacts. Additionally, the SSC system may infer a safety concern in response to determining that a real-time communication session between a client device and a third-party device, which listed on a grey-list of contacts, is beyond the scope of permitted limited communications.

In each of the examples noted above, in the event that a safety concern is inferred based on a real-time communication session, or lack thereof, the SSC system may be configured to send a notification to a trusted person, such as a PAH. A trusted person, as described herein, may include the PAH, or an individual delegated by the PAH to receive notifications from the SSC system based on a fulfillment of one or more distribution rules. The one or more distribution rules may relate to a particular SAH, a time of day, a day of the week, a geographic location of the client (i.e. PAH or SAH), a corresponding geographic location of the trusted person, or the magnitude of the subscriber safety score. For example, the SSC system may infer a safety concern for a SAH who is conducting a real-time communication session while at school, during school hours, and on a school day. In this example, the SSC system may send a notification to one or more trusted persons, such as the PAH and a school representative designated by the PAH as a trusted person.

In another non-limiting example, the SSC system infers that a safety concern impacts the health of a client (i.e. SAH or PAH) based on an analysis of ambient conditions (i.e. geographic location, ambient noise, ambient temperature, ambient humidity), and in doing so, transmit a notification to one or more trusted persons, such as the PAH and an emergency responder designated by the PAH as a trusted person.

In yet another non-limiting example, the SSC system may designate a group of trusted people to receive notifications associated with a client (i.e. PAH or SAH). The PAH may further indicate that a notification of a safety concern associated with a client be sent to one or more trusted people within the group, based on their geographic proximity to the client at a point in time that the SSC system infers a safety concern. Thus, in response to inferring a safety concern, the SSC system may determine a geographic location of each trusted person within the group in order to further identify a subset of trusted people that are to receive the notification. It is noteworthy that the SSC system may be configured to send a notification to one or more trusted people based on criteria other than geographic proximity to the client, such as the time of day, a day of the week, the magnitude of the subscriber safety score, or any combination thereof.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a computing environment 100 of a telecommunications network 102 that facilitates a Safety Subscriber Control (SSC) system 104. The SSC system 104 may be configured to enable a primary account holder (PAH) of a client account to configure high-fidelity access privileges for service features accessible via the client account.

The telecommunications network 102 may include multiple base stations, such as base station 106, as well as a core network 108 that serves one or more client device(s) 110(1)-110(M). In the illustrated example, the client device(s) 110(1)-110(M) may be associated with a client account, such as a telecommunications service account. The client account may include a plurality of clients, each of whom shares access to service features accessible via the telecommunications network 102. The service features may include various mediums of communication, such as voice communication and text communication (i.e. SMS and MMS)

In various examples, an IP Multimedia Subsystem (IMS) core 112 may reside in the core network 108. The IMS core 112 may include an application function (AF) 114, such as a Proxy Call Session Control Function (P-CSCF) 116, an Interrogating Call Session Control Function (I-CSCF) 118, and a Service Call Session Control Function (S-CSCF) 120. The P-CSCF 116 behaves like a proxy by accepting requests and serving them internally or forwarding them towards another entity, such as Enterprise Information Technology (EIT) server(s) 122. The S-CSCF 120 acts as a Session Initiation Protocol (SIP) registrar and in some cases as a SIP redirect server. The S-CSCF 120 is responsible for processing the location registration of a client device, client authentication, and call routing and processing. The I-CSCF 118 is tasked with selecting an S-CSCF 120 for serving an initial SIP request, particularly when a client device initiating the request does not know which S-CSCF 120 should receive the request.

Additionally, the core network 108 may further include a Policy and Charging Control (PCC) 124 and a gateway 126. The PCC 124 may enable detection of communication service data flow and provide parameters for policy control and/or charging control. In the illustrated example, the PCC 124 may include a policy engine 128, such as a Policy and Charging Rules Function (PCRF) 130, and a Home Subscriber Server (HSS) 132. The HSS 132 may be configured to authenticate an identity of a client and authorize operation of a corresponding client device on the telecommunications network 102.

Further, the gateway 126 may include one or more servers and related components that are tasked with providing connectivity between the IMS core 112, the client device(s) 110(1)-110(M) and the internet 134. More specifically, the gateway 126 may act as a point of entry and exit for data traffic.

Moreover, the core network 108 may further include one or more Enterprise Information (EIT) server(s) 122, such as but not limited to, the SSC system 104. The SSC system 104 may be configured to monitor real-time communication sessions initiated by, or received at, the client device(s) 110(1)-110(M) associated with a client account. In doing so, the SSC system 104 may infer whether the client device(s) 110(1)-110(M) may be impacted by a safety concern. The safety concern may impact the health or well-being of the client associated with the client device(s) 110(1)-110(M).

In various examples, an SSC application may reside on client device(s) 110(1)-110(M) to monitor an operation of client device(s) 110(1)-110(M) and detect a real-time communication session that is initiated by the client device(s) 110(1)-110(M) or a third-party device interacting with the client device(s) 110(1)-110(M). In doing so, the SSC application may transmit an indication to the SSC system 104 indicating that a real-time communication session is in progress. In doing so, the SSC system 104 may selectively monitor the real-time communication and transmit a pull request to the client device(s) 110(1)-110(M) for communication session data associated with the real-time communication session.

Moreover, the SSC system 104 may analyze the communication session data and further generate a subscriber safety score that numerically quantifies a likelihood that the client device(s) 110(1)-110(M) engaged in the real-time communication session may be impacted by a safety concern. In response to determining that the client device(s) 110(1)-110(M) may be impacted by a safety concern, the SSC system 104 may transmit notification data to a trusted device of the client device(s) 110(1)-110(M) that provides an alert of the inferred safety concern. In some examples, the SSC system 104 may transmit communication session modification data to the client device(s) 110(1)-110(M) engaged in the real-time communication session that automatically terminates the real-time communication session.

In the illustrated example, the telecommunications network 102 may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. The computing environment 100 may include a core network 108. The core network 108 may provide telecommunication and data communication services to multiple client devices, such as a 3G-compatible client device and an LTE-compatible client device, collectively referred to as client device(s) 110(1)-110(M). The client device(s) 110(1)-110(M) may correspond to any sort of electronic device operating on the telecommunications network, such as a cellular phone, a smartphone, a tablet computer, an electronic reader, a media player, a gaming device, a personal computer (PC, a laptop computer), etc. The client device(s) 110(1)-110(M) may have a subscriber identity module (SIM), such as an eSIM, to identify the respective electronic device to a telecommunications service provider network (also referred to herein as "telecommunications network").

Additionally, the SSC system 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device(s) 110(1)-110(M) via one or more network(s). The one or more network(s) may include public networks such as the Internet, private networks such as institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
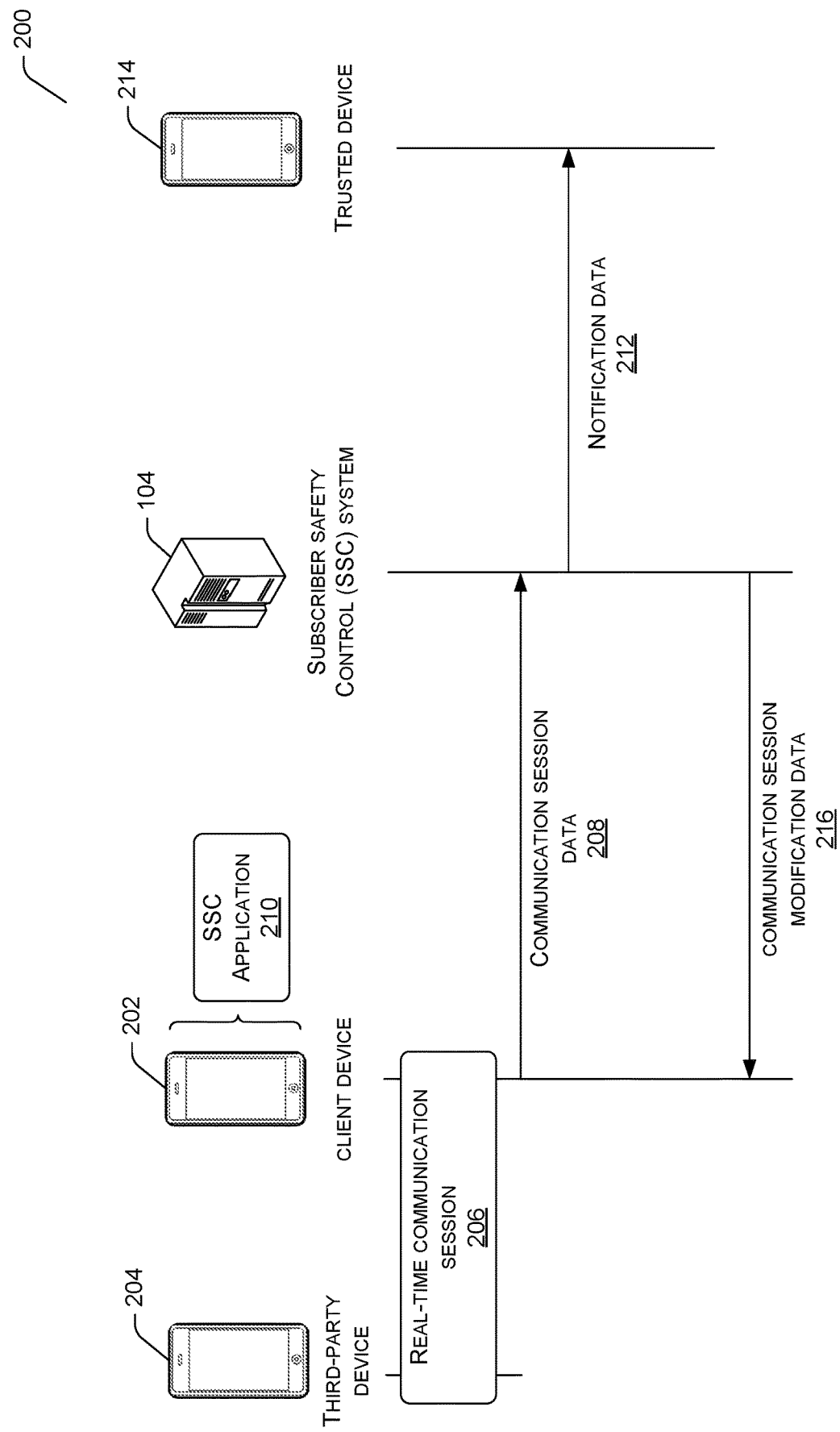
FIG. 2 illustrates a block diagram of a process for monitoring a real-time communication session between a client device of a client account and a third-party device, and further inferring a safety concern that impacts the client device.

FIG. 2 illustrates a block diagram of a process 200 for monitoring a real-time communication session between a client device 202 of a client account and a third-party device 204, and further inferring a safety concern that impacts the client device 202. Client device 202 may correspond to one of the client device(s) 110(1)-110(M).

In the illustrated example, a real-time communication session 206 may be initiated by or received at, a client device 202 associated with a client account. The real-time communication session 206 may be a voice communication or a text communication (i.e. SMS or MMS) between the client device 202 and a third-party device 204.

Following the start of the real-time communication session 206, the client device 202 may transmit communication session data 208 to the Subscriber Safety Control (SSC) system 104. In some examples, the SSC system 104 may receive a notification that the client device 202 is interacting with the third-party device 204 via an SSC application 210 installed on the client device 202. In this way, the SSC system 104 may elect to monitor the real-time communication session 206 based at least in part on one or more communication rules, and in doing so, request communication session data 208 from the client device 202.

The communication session data 208 may include audio data associated with a voice communication, text data associated with a text communication (i.e. SMS, MMS, or transcript of a voice communication), and session metadata. The session metadata may further include a client identifier associated with the client device, a third-party identifier associated with the third-party device interacting with the client device, and sensor data from the sensor(s) of the client device.

Moreover, the SSC system 104 may analyze the communication session data 208 to determine whether a safety concern may impact the client device or the corresponding client. In various examples, the SSC system 104 may generate a subscriber safety score that quantifies a likelihood that a safety concern may impact a client device or the corresponding client. In one example, the SSC system may determine that the subscriber safety score is greater than or equal to a first predetermined safety threshold but less than a second predetermined safety threshold, and in doing so, transmit notification data 212 to trusted device 214. The trusted device 214 may be associated with a PAH of the client account or an individual delegated by the PAH to receive notifications from the SSC system 104. Further, the notification data 212 may include computer-executable instructions that automatically display an alert on the trusted device 214, the alert describing the inferred safety concern associated with the client device, or the client.

In another example, the SSC system 104 may determine that the subscriber safety score is greater than or equal to a first and second predetermined safety threshold. In this instance, the SSC system 104 may transmit communication session modification data 216 to the client device 202 in combination with the notification data 212 that is sent to the trusted device 214. The communication session modification data 216 may include computer-executable instructions that automatically terminate the real-time communication session 206 between the client device 202 and the third-party device 204. In this example, the notification data 212 may further indicate that the real-time communication session has been terminated.

It is noteworthy that the first predetermined safety threshold and the second predetermined safety threshold may be set by a PAH of the client account, an operator of the SSC system, or an administrator of the telecommunication service provider.

Figure 3:
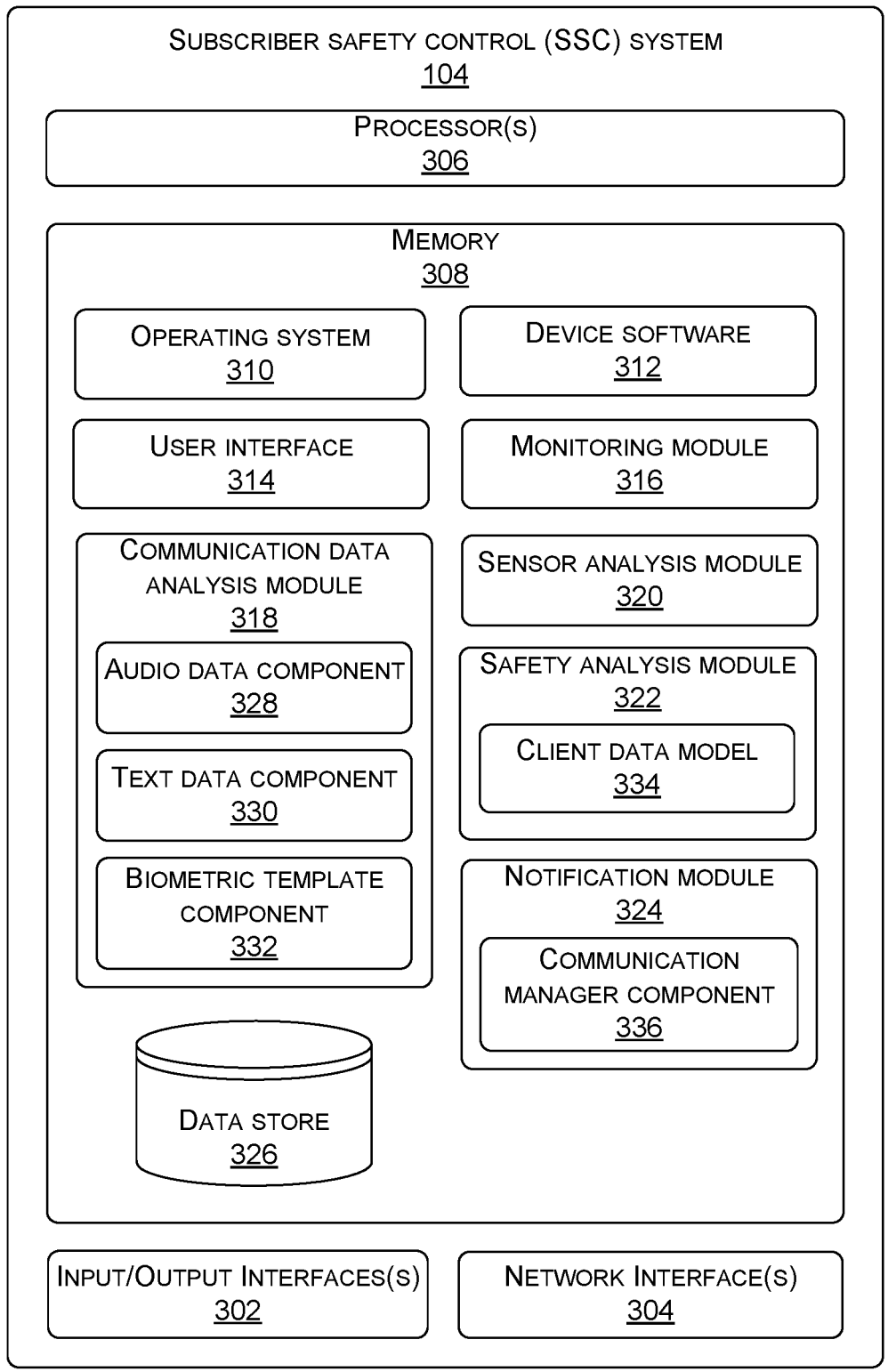
FIG. 3 illustrates a block diagram of various components of a Subscriber Safety Control (SSC) system that is configured to analyze a real-time communication session associated with a client device and further infer a safety concern.

FIG. 3 illustrates a block diagram of various components of a Subscriber Safety Control (SSC) system 104 that is configured to analyze a real-time communication session associated with a client device and further infer a safety concern. In various examples, a safety concern may relate to the health and well-being of a client associated with the client device. The SSC system 104 may infer whether a client associated with the client device is a likely subject of a safety concern based on an audio data, text data, or session metadata associated with the real-time communication session.

The SSC system 104 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the SSC system 104 may include network interface(s) 304. The network interface(s) 304 may include any sort of transceiver known in the art. For example, the network interface(s) 304 may include a radio transceiver that performs the function of transmitting and receiving radio frequency communications via an antenna. In addition, the network interface(s) 304 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB).

Further, the SSC system 104 may include one or more processor(s) 306 that are operably connected to memory 308. In at least one example, the one or more processor(s) 306 may be a central processing unit(s) (CPU), graphics processing unit(s) (GPU), or both a CPU and GPU or any other sort of processing unit(s). Each of the one or more processor(s) 306 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 306 may also be responsible for executing all computer applications stored in the memory, which can be associated with common types of volatile (RAM) and/or non-volatile (ROM) memory.

In some examples, memory 308 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 308 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 308 may include an operating system 310, device software 312, a user interface 314, a monitoring module 316, a communication data analysis module 318, a sensor analysis module 320, a safety analysis module 322, a notification module 324, and a data store 326. The operating system 310 may be any operating system capable of managing computer hardware and software resources. The operating system 310 may include an interface layer that enables applications to interface with the input/output interface(s) 302 and the network interface(s) 304. The interface layer may comprise public APIs, private APIs, or a combination of both. Additionally, the operating system 310 may include other components that perform various other functions generally associated with an operating system.

The device software 312 may include software components that enable the SSC system 104 to perform functions, such as basic input/output system (BIOS), Boot ROM, or a bootloader that boots up the SSC system 104 and executes the operating system 310 following power-up of the SSC system 104.

The user interface 314 may enable a PAH, or a delegated user, to provide inputs and receive outputs from the SSC system 104. Example data inputs may include generating one or more communication rules to monitor, intercept, and/or selectively terminate a real-time communication session associated with a client of a client account. In this example, the one or more communication rules may be based on a subscriber safety score generated by the safety analysis module 322, an identity of a third-party device or third-party relative to one or more predetermined lists of contacts, or ambient environmental conditions, as defined by the sensor analysis module 320.

Other example data inputs may be defining predetermined safety thresholds and establishing distribution rules for trusted persons to receive notifications related to a safety concern of a client. The notifications may be configured based on the nature of the safety concern, a proximity of the trusted person to the client, and other criteria such as the time of day, a day of the week, the magnitude of the subscriber safety score, or any combination thereof.

The monitoring module 316 may be configured to monitor real-time communication sessions between a client device associated with a client account and another third-party device. Monitoring may occur on a continuous basis, per a predetermined list of contacts, or in response to a triggering event. The predetermined list of contacts may include one or more of a permissible list of contacts, an impermissible list of contacts, and a grey-list of contacts. Each predetermined list of contacts may include a list of third-party devices, third-party users, or a combination of both. Moreover, the triggering event may be a time of day, a day of the week, a geographic location of the client device at a point in time that a real-time communication session is initiated, or any combination thereof. The triggering event may also include a determination that a real-time communication session has been initiated by an unknown third-party or unknown third-party user that is not listed on any one of the predetermined lists of contacts.

The communication data analysis module 318 may be configured to analyze audio data and text data associated with a real-time communication session. More specifically, the communication data analysis module 318 may include an audio data component 328, a text data component 330, and a biometric template component 332. The audio data component 328 may interact with the monitoring module 316 to access audio data from communication session data retrieved from a client device. The audio data component 328 may further isolate biometric samples of a client voice associated with the client device and a third-party voice associated with the third-party device, and in doing so, perform a voice biometric analysis on the client's voice and the third-party's voice. The voice biometric analysis may include an analysis of a vocal accent, a tonality, a refraction of sound, a vocal frequency, a vocal pitch, or any combination thereof. More particularly, the audio data component 328 may monitor a client's voice or a third-party's voice for changes in frequency, pitch, or tonality that may be associated with a safety concern. In some examples, the audio data component 328 may compare audio data of a client's voice or third-party's voice with registered biometric templates accessible via the data store 326.

The biometric template component 332 may generate statistical pattern-matching templates that can be used as registered biometric templates for the purpose of analyzing audio data of a real-time communication session. By way of example, a client of a client account may proactively generate a biometric template. In other examples, a biometric template may be generated unobtrusively for each client and third party by monitoring each client's voice and third-party's voice during real-time communication sessions over a predetermined time interval. As more audio data becomes available, the biometric template component 332 may develop a more accurate biometric template for each client and third-party. Since each biometric template is intended to reflect a baseline client profile of nominal, non-threatening and safe, real-time communications, the biometric template component 332 may generate each biometric template using audio data from real-time communication sessions that are assigned a low subscriber safety score (i.e. low, 1 to 3, or green) by the safety analysis module 322.

The text data component 330 may analyze vocabulary used by the client and third-party during a real-time communication session to determine whether the vocabulary used may be an indication of a safety concern. In one example, the text data component 330 may access, via the audio data component 328 or monitoring module 316, audio data from communication session data retrieved from a client device. In doing so, the text data component 330 may employ at least one of a natural language processing (NLP) or a natural language understanding (NLU) algorithm to parse through the audio data and generate text data that corresponds to the spoken discourse of the real-time communication session. In this way, the audio data component 328 may compare vocabulary used by the client and third-party to a list of impermissible vocabulary from the data store 326 that may indicate a safety concern.

In another example, the text data component 330 may retrieve text data associated with a text communication (i.e. SMS, MMS, or transcript of a voice communication) from communication session data, via the monitoring module 316. In this example, the text data component 330 may compare vocabulary used within the text communication to the list of impermissible vocabulary from the data store 326.

The sensor analysis module 320 may be configured to analyze sensor data from a client device that is engaged in a real-time communication session. The sensor analysis module 320 may interact with the monitoring module 316 to access session data from communication session data retrieved from a client device. The session metadata may include at least sensor data. The sensor data may be associated with one or more sensors of the client device, such as a GPS sensor, accelerometer sensors, proximity detection sensors, temperature sensors, hygrometer sensors, and/or so forth. The sensor analysis module 320 may analyze the sensor data to determine ambient conditions that may impact a client during the real-time communication session. In doing so, the sensor analysis module 320 may determine whether the client is impacted by an environmental safety concern at a particular geographic location or due to temperature, humidity, noise pollution, or any combination thereof. In some examples, the sensor analysis module 320 may retrieve, from the data store 326, a list of permissible environmental conditions that include ranges for different environmental conditions (i.e. temperature range, humidity range, noise pollution range, etc.), and in doing so, compare the sensor data associated with the client device with the list of permissible environmental conditions. In this way, the sensor analysis module 320 may determine whether ambient environmental conditions may pose a safety concern to the client of the client device.

The safety analysis module 322 may generate a subscriber safety score for a client device of a client account based at least in part on an analysis of a real-time communication session. The analysis of the real-time communication session may be based on client profile data or a client data model. In a first example, the safety analysis module 322 may generate client profile data that is intended to provide a baseline client profile that is associated with nominal, non-threatening and safe, real-time communications for a particular client device, or client. The client profile data may be based on historical instances of real-time communication sessions between a client device and one or more third-party devices and may include data-points related to audio data, text data, and session metadata (i.e. device identifiers, sensor data, and/or so forth). More specifically, client profile data may include a record of regularly conducted real-time communication sessions, historical ambient conditions that are nominally associated with each real-time communication session, a voice biometric template of the client associated with the client device, or any combination thereof. The voice biometric template may reflect a client's baseline voice pattern. The baseline voice pattern may be based on a combination of vocal accent, tonality, refraction of sound, vocal frequency, or vocal pitch. The safety analysis module 322 may continuously evaluate client profile data based on current and historical real-time communication sessions. As more client profile data becomes available, a continuously more accurate record of client profile data can be developed.

Moreover, the safety analysis module 322 may aggregate an analysis of the current communication data (i.e. audio data and/or text data), and session metadata (i.e. sensor data) that is retrieved from the communication data analysis module 318 and the sensor analysis module 320, respectively. In doing so, the safety analysis module 322 may employ one or more trained machine learning algorithms to correlate the aggregated data with the client profile data to determine whether the aggregated data indicates a departure from a baseline client profile of nominal, non-threatening and safe, real-time communications. In this way, the safety analysis module 322 may generate a subscriber safety score based on the degree of correlation, or lack thereof, between the aggregated data and the client profile data.

In some examples, the safety analysis module 322 may generate a subscriber safety score that is based on vocabulary used during a real-time communication session, ambient conditions associated with a real-time communication session, an identity of a third-party device or third-party that is interacting with the client device during the real-time communication session, or non-performance or an irregular performance of a regularly conducted real-time communication session.

In a second example, the safety analysis module 322 may generate a client data model 334 based on historical instances of real-time communication sessions between a client device and one or more third-party devices. In some examples, the safety analysis module 322 may use the client profile data described earlier to generate a client data model 334.

The safety analysis module 322 may generate each client data model, such as the client data model 334, such using one or more machine learning algorithms, such as, but not limited to, supervised learning, unsupervised learning, semi-supervised learning, naive Bayes, Bayesian networks decision trees, neural networks, fuzzy logic models, multiclass decision forest, and/or probabilistic classification.

The safety analysis module 322 may employ one or more trained machine learning algorithms to correlate communication data (i.e. audio data and/or text data), and session metadata (i.e. sensor data) of a current real-time communication session with data-points of the client data model 334. The safety analysis module 322 may further assign a subscriber safety score for a real-time communication session based on the degree of correlation, or lack thereof, with the client data model 334.

The safety analysis module 322 may continuously evaluate the client data model 334 based on current and historical real-time communication sessions. As more client profile data becomes available, a continuously more accurate client data model 334 can be developed.

In various examples, the subscriber safety score may be alpha-numeric (i.e. 0 to 10, or A to F), descriptive (i.e. low, medium, or high), based on color, (i.e. red, yellow, or green), or any other suitable rating scale. In one example, a high subscriber safety score (i.e. 7 to 10, high, or red) may reflect an inference that the client is subject to a heightened risk of their safety. In this example, a threshold high subscriber safety score (i.e. 7, high, or red) may be akin to the second predetermined safety threshold described earlier. In another example, a medium subscriber safety score (i.e. 4 to 6, medium, or yellow) may reflect an inference that the client is subject to a medium level of risk.

The notification module 324 may be configured to generate one or more notifications that alert a trusted person of a safety concern associated with a client device, or client, of a client account. The notification module 324 may automatically generate a notification based at least in part on the subscriber safety score generated by the safety analysis module 322 along with its corresponding underlying rationale. By way of example, the notification module 324 may receive an indication of a high subscriber safety score (i.e. 7 to 10, high, or red) that is based on ambient environmental conditions of a client device (i.e. temperature, humidity, noise, etc.). In doing so, the notification module 324 may generate a notification alerting a trusted person of a safety concern related to a particular ambient environmental condition.

The notification module 324 may further include a communication manager component 336 that is configured to facilitate transmission of one or more notifications to one or more trusted persons, designated by a PAH of a client account. More specifically, the communication manager component 336 may generate one or more distribution rules that control the transmission of notifications to select trusted persons. The distribution rules may identify a particular trusted person, or group of trusted people, to receive notifications for a particular client (i.e. PAH or SAH) of a client account. Additionally, or alternatively, the distribution rules may identify a particular trusted person, or group of trusted people, based on a time of day, a day of the week, a geographic location of the client (i.e. PAH or SAH), a corresponding geographic location of the trusted person, or the magnitude of the subscriber safety score.

In some examples, the distribution rules may be configured to automatically terminate a real-time communication session between a client device and third-party device based at least in part on a comparison of the subscriber safety score relative to a predetermined safety threshold. In these examples, the notification module 324 may generate communication session modification data for transmission to the client device that automatically terminates the real-time communication session between the client device and the third-party device. It is noteworthy that the communication session modification data may be sent in addition to a notification being sent to a trusted person.

The data store 326 may be configured to store instances of historical real-time communication sessions, predetermined lists of contacts (i.e. list of permissible contacts, list of impermissible contacts, and a grey-list of contacts), voice biometric templates for clients of a client account, voice biometric templates associated with third-parties that interact with the clients during a real-time communication session, a list of impermissible vocabulary, a list of permissible environmental conditions (i.e. geographic location, temperature, humidity, and noise), and client profile data used to analyze a real-time communication session and/or generate a client data model 334.

Figure 4:
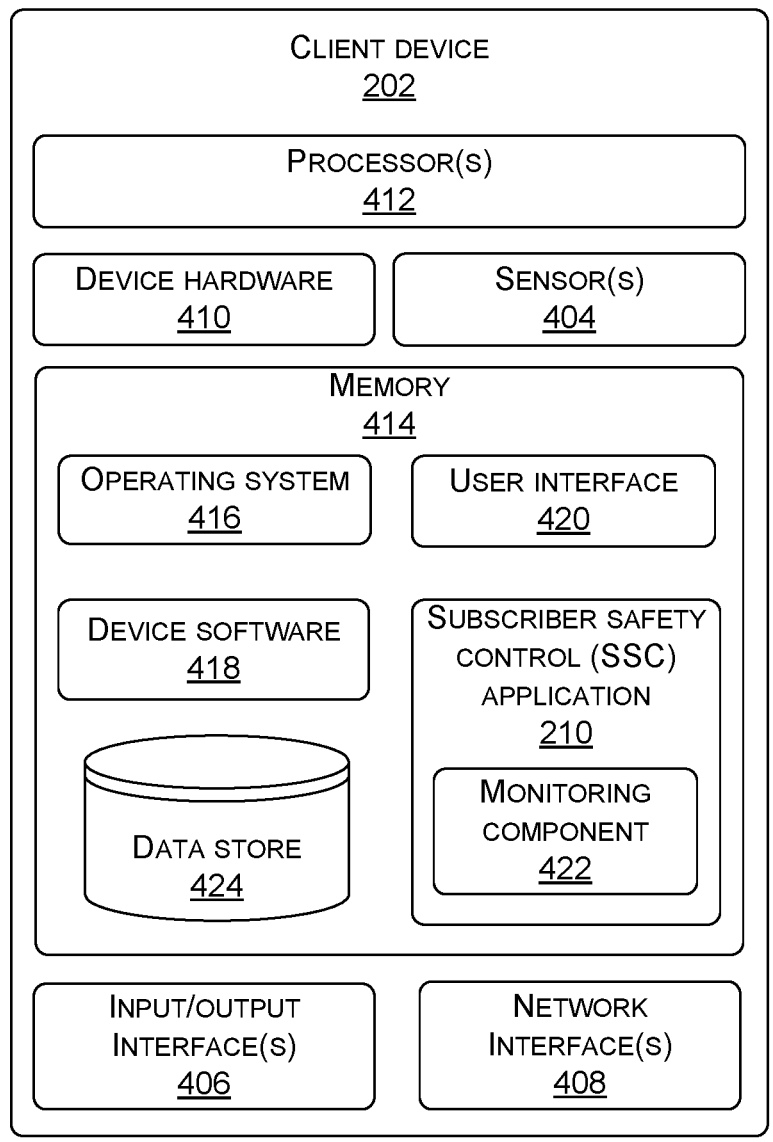
FIG. 4 illustrates a block diagram of various components of a client device configured to interact with a Subscriber Safety Control (SSC) system.

FIG. 4 illustrates a block diagram of various components of a client device configured to interact with a Subscriber Safety Control (SSC) system. In various examples, the client device 202 may be configured to detect and monitor real-time communication sessions initiated by or received at, the client device 202 and further compile communication session data for transmission to the SSC system 104 for further analysis, and in some instances, intervention.

In the illustrated example, the client device 202 may include sensor(s) 404. The sensor(s) 404 may be configured to capture ambient conditions that impact the client device 202. The sensor(s) 404 may include a Global Positioning System (GPS) sensor, accelerometer sensors, proximity detection sensors, temperature sensors, and hygrometer sensors.

Further, the client device 202 may include input/output interface(s) 406. The input/output interface(s) 406 may include any type of output interface known in the art, such as a display (e.g. a liquid crystal display), speakers, a vibrating mechanism, or a tactile feedback mechanism. Input/output interface(s) 406 also include ports for one or more peripheral devices, such as headphones, peripheral speakers, or a peripheral display. Further, the input/output interface(s) 406 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the client device 202 may include network interface(s) 408. The network interface(s) 408 may include any sort of transceiver known in the art. For example, the network interface(s) 408 may include a radio transceiver that performs the function of transmitting and receiving radio frequency communications via an antenna. In addition, the network interface(s) 408 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 408 may include wired communication components, such as an Ethernet port or a Universal Serial Bus (USB).

Moreover, the client device 202 may include device hardware 410. The device hardware 410 may include hardware that is typically located in a mobile telecommunication device. For example, the device hardware 410 may include signal converters, transceivers, antennae, hardware decoders and encoders, graphics processors, a Subscriber Identity Module (SIM) card slot, and/or the like that enables the client device 202 to execute applications and provide telecommunication and data communication functions. The SIM may be an integrated circuit chip that is inserted into the SIM card slot of the client device 202, or an embedded SIM that is hardwired into the circuit board of the client device 202.

Further, the client device 202 may include one or more processor(s) 412 that are operably connected to memory 414. The one or more processor(s) 412 may be similar to the one or more processor(s) 306 and the memory 414 may be similar to the memory 308.

In the illustrated example, the memory 414 may include an operating system 416, device software 418, a user interface 420, a Subscriber Safety Control Application (SSC) application 210, and a data store 424. The operating system 416 may be similar to the operating system 310 and the device software 418 may be similar to the device software 312.

The user interface 420 may enable a client (i.e. PAH or SAH) to provide input and receive output from the client device 202. Example data input for a PAH may include generating one or more communications rules to intercept and/or selectively terminate a real-time communication session associated with a client of a client account. Other example data input by a PAH may include defining predetermined safety thresholds and establishing distribution rules for trusted persons to receive notifications related to a safety concern of a client.

The SSC application 210 may be configured to transmit data inputs received from a PAH via the user interface 420 of the client device 202 to the SSC system 104 for integration into a corresponding module of the SSC system 104 (i.e. monitoring module 316 for communication rules and notification module 324 for distribution rules).

Moreover, the SSC application 210 may be further configured to generate communication session data for each real-time communication session initiated by or received at, the client device 202. Each communication session data may include audio data associated with a voice communication, text data associated with a text communication (i.e. SMS, MMS, or transcript of a voice communication), and session metadata. The session metadata may further include a client identifier associated with the client device, a third-party identifier associated with the third-party device interacting with the client device, and sensor data from the sensor(s) 404 of the client device 202.

In various examples, the SSC application 210 may include a monitoring component 422 that is substantially similar to the monitoring module 316 of the SSC system 104. By way of example, the monitoring component 422 may determine whether to selectively monitor a real-time communication session that is initiated by or received at, the client device 202, based on a predetermined list of contacts and/or triggering events. Alternatively, the SSC application 210 may generate communication session data for substantially all real-time communication sessions initiated by or received at, the client device 202. The communication session data may then be transmitted to the SSC system 104, at which point the SSC system 104 may determine whether to selectively monitor each real-time communication session based on predetermined lists of contacts and/or triggering events.

The data store 424 may include a repository of client profile data and historical instances of real-time communication sessions (i.e. audio data, text data, and session metadata) initiated by, or received by, the client device 202. In some examples, the data store 424 may further include predetermined lists of contacts for embodiments in which the SSC application 210 includes a monitoring component 422.

Figure 5:
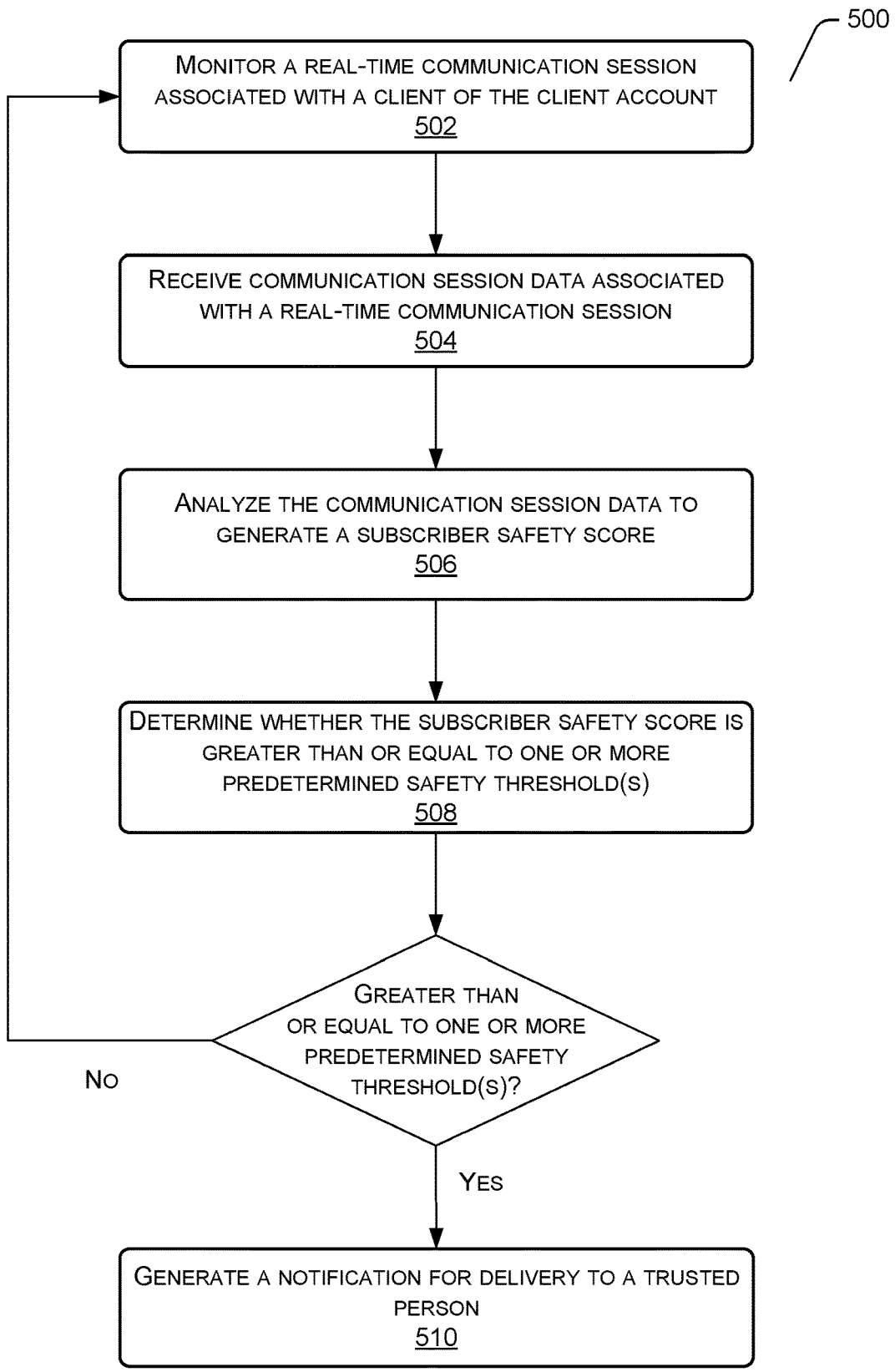
FIG. 5 illustrates a process for analyzing a real-time communication session associated with a client and further transmitting a notification of an inferred safety concern to a trusted person.
Figure 6:
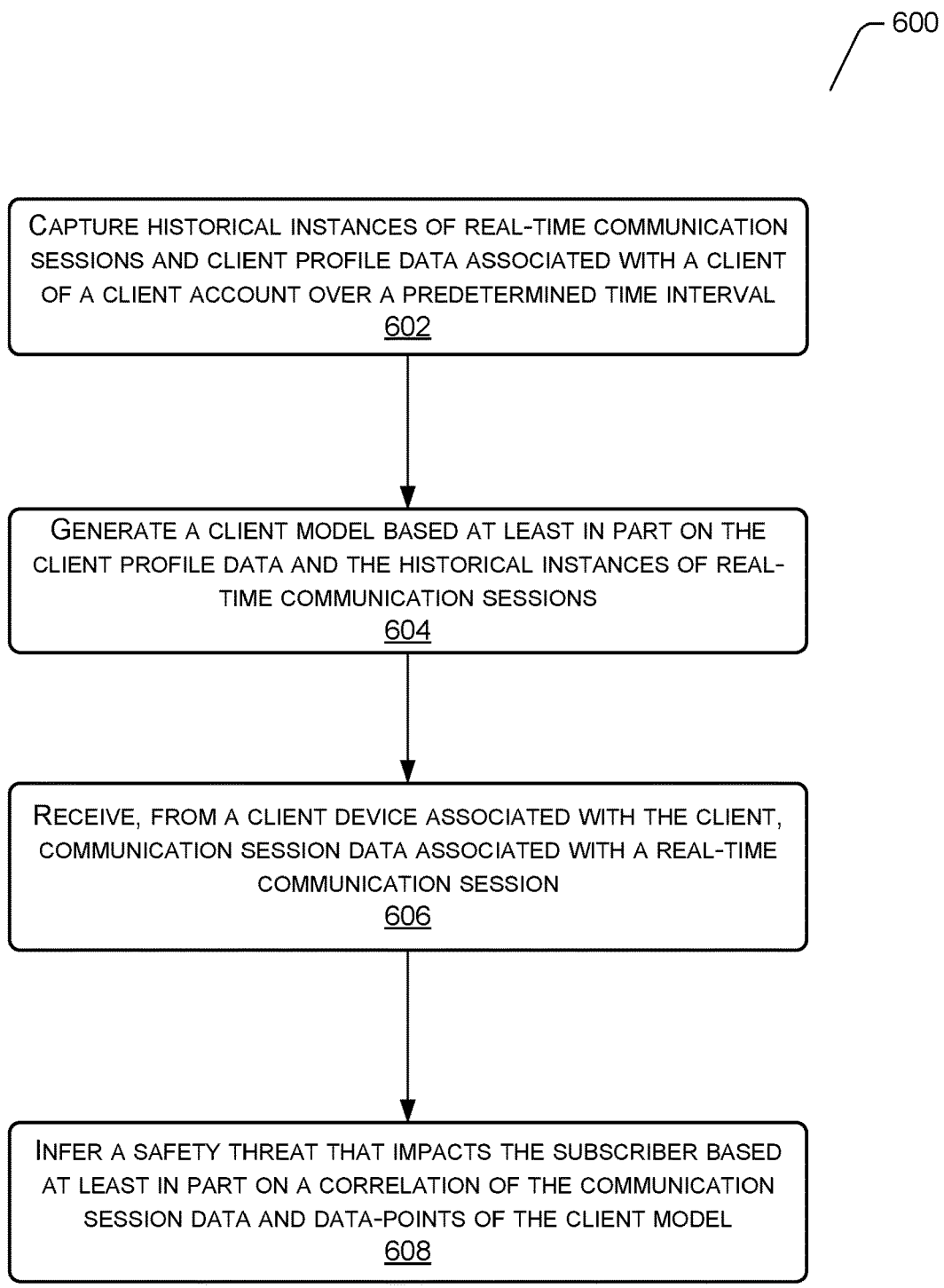
FIG. 6 illustrates a process for generating a client data model that facilitates inferring a safety concern that impacts a client device or client associated with a client account.
Figure 7:
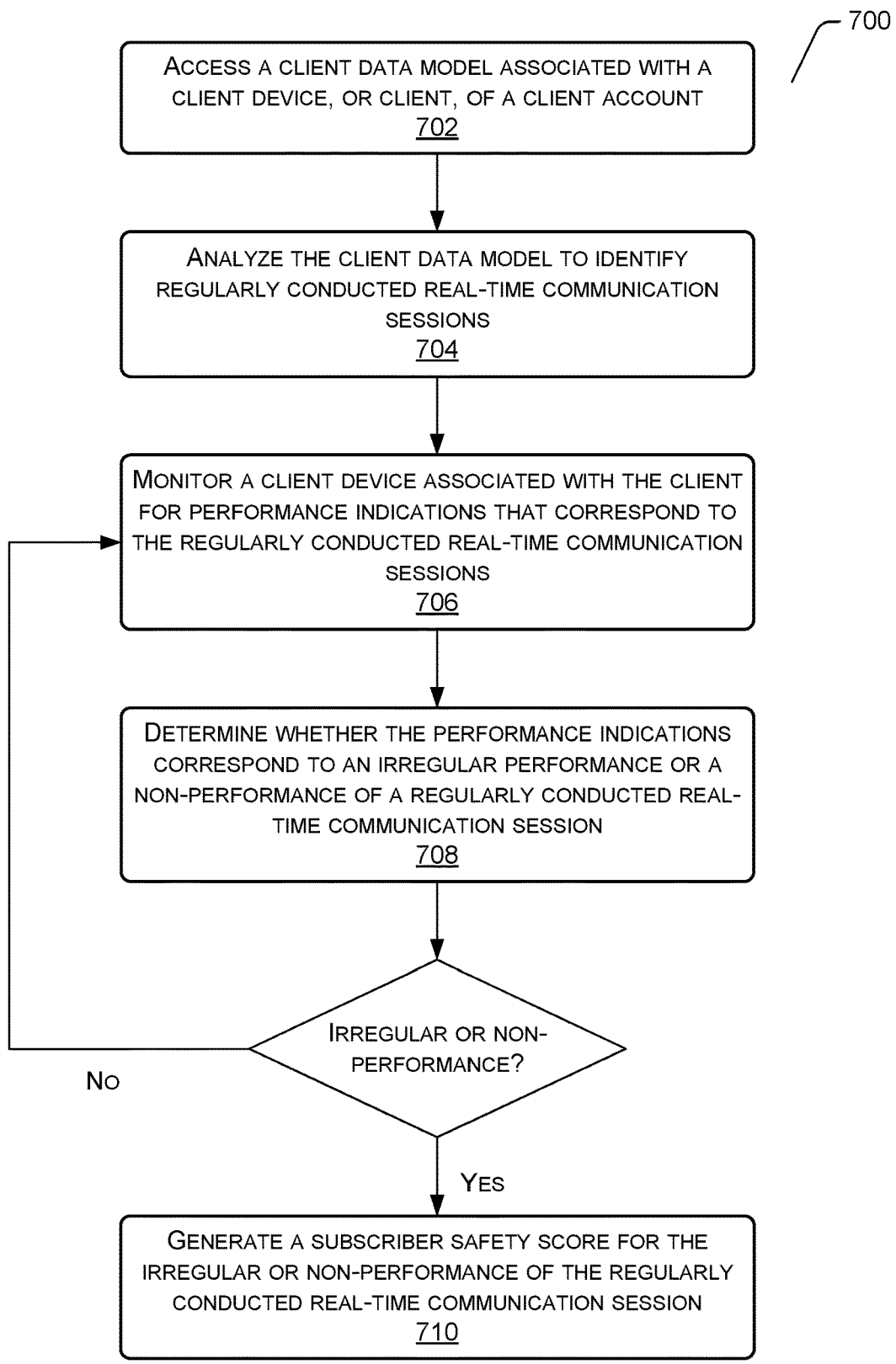
FIG. 7 illustrates a process for monitoring performance indications of a regularly conducted real-time communication session to facilitate inferring a safety concern that impacts a client device or client associated with a client account.

FIGS. 5 through 7 present processes 500 through 700 that relate to operations of the Subscriber Safety Control (SSC) system. Each of processes 500 through 700 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 through 700 are described with reference to the computing environment 100 of FIG. 1.

FIG. 5 illustrates a process 500 for analyzing a real-time communication session associated with a client and further transmitting a notification of an inferred safety concern to a trusted person. The real-time communication session may be a voice communication or a text communication that is initiated by or received at, a client device associated with a client account.

At 502, the SSC system may monitor a real-time communication session associated with a client of the client account. Monitoring may occur on a continuous basis, per a predetermined list of contacts, or in response to a triggering event. The predetermined list of contacts may include one or more of a permissible list of contacts, an impermissible list of contacts, and a grey-list of contacts.

At 504, the SSC system may receive communication session data associated with a monitored real-time communication session. The communication session data may include audio data associated with voice communication, text data associated with a text communication or a transcription of a voice communication, and session metadata.

At 506, the SSC system may analyze the communication session data to generate a subscriber safety score. The subscriber safety score is intended to reflect a likelihood that a client (i.e. PAH or SAH) associated with a client account may be impacted by a safety concern that affects their health or wellbeing. The SSC system may generate the subscriber safety score by analyzing audio data of a real-time communication session. For example, the SSC system may capture and analyze a biometric voice sample of the client's voice or the third-party's voice for indications of a safety concern. Alternatively, or additionally, the SSC system may analyze text data associated with a real-time communication session (i.e. SMS, MMS, or transcript of voice communication) vocabulary used by the client or the third-party for indications of a safety concern. In yet another example, the SSC system may generate a subscriber safety score based on session metadata associated with the real-time communication, such as sensor data that is indicative of environmental conditions, and device identifiers that can identify the third-party interacting with the client device.

In some examples, the SSC system may generate a subscriber safety score by correlating the audio data, text data, and session metadata associated with the real-time communication session with client profile data associated with the client device, or client. The client profile data may comprise a historical record of real-time communication sessions associated with the client, or client device. The client profile data may provide a baseline client profile of nominal, non-threatening and safe, real-time communications for the particular client device, or client.

At 508, the SSC system may determine whether a subscriber safety score is greater than or equal to one or more predetermined safety thresholds. For example, the SSC system may have established one or more predetermined safety thresholds via a PAH of the client account, operator of the SSC system or an administrator of the telecommunication service provider. Each predetermined safety threshold may trigger a different action depending on whether each predetermined safety threshold has been reached.

For example, a subscriber safety score that is greater than or equal to a first predetermined threshold may trigger transmission of a notification to a trusted person. By comparison, a subscriber safety score that is greater than a second predetermined safety threshold, the second predetermined threshold being higher than the first predetermined safety threshold, may further trigger the SSC system to automatically terminate the real-time communication session between the client device and third-party device.

At 510, the SSC system may determine that the subscriber safety score is greater than or equal to the one or more predetermined safety thresholds. In doing so, the SSC system may generate a notification that identifies the safety concern. The notification may be further configured for delivery to a trusted person, or trusted people, based at least in part on one or more distribution rules. The distribution rules may identify the trusted person(s) to receive the notifications for a particular client (i.e. PAH or SAH). The distribution rules may be further based at least in part on a time of day, a day of the week, a geographic location of the client (i.e. PAH or SAH), a corresponding geographic location of the trusted person, or the magnitude of the subscriber safety score.

Additionally, or alternatively, the SSC system may automatically terminate the real-time communication session based on the subscriber safety score being greater than or equal to the one or more predetermined safety thresholds. In this latter example, the SSC system may generate communication session modification data for delivery to the client device that includes computer-executable instructions to automatically terminate the real-time communication session.

In the event that the SSC system determines that the subscriber safety score is less than the one or more predetermined safety thresholds, process 500 may return to step 502, and the SSC system may continue to monitor the real-time communication session.

FIG. 6 illustrates a process 600 for generating a client data model that facilitates inferring a safety concern that impacts a client device or client (i.e. PAH or SAH) associated with a client account. The client data model is intended to provide a baseline profile of a nominal, non-threatening and safe, real-time communications for a particular client device, or client.

At 602, the SSC system may capture historical instances of real-time communication sessions that occur between a particular client device, or a particular client, and one or more third-party devices over a predetermined time interval. In some examples, the SSC system may capture client profile data such as a record of regularly conducted real-time communication sessions, historical ambient conditions that are nominally associated with each real-time communication session, a voice biometric template of the client associated with the client device, or any combination thereof.

At 604, the SSC system may generate a client data model based at least in part on the client profile data and the captured historical instances of real-time communication sessions. The SSC system may generate the client data model using one or more machine learning algorithms, such as, but not limited to, supervised learning, unsupervised learning, semi-supervised learning, naive Bayes, Bayesian networks decision trees, neural networks, fuzzy logic models, a multiclass decision forest, and/or probabilistic classification.

At 606, the SSC system may receive, from a client device associated with the client (i.e. PAH and SAH), communication session data associated with a real-time communication session. In this example, the client corresponds to the client upon which the client data model was generated. Further, the communication session data may include audio data, text data, and session metadata that is associated with the real-time communication session.

At 608, the SSC system may analyze the communication session data by identifying data patterns between components of the communication session data (i.e. audio data, text data, and session metadata) and the data points of the client data model.

At 610, the SSC system may generate a subscriber safety score based at least in part on a similarity between the components of the communication session data and the client data model. In response to determining that the subscriber safety score is greater than or equal to a predetermined threshold, the SSC system may further transmit a notification to one or more trusted person(s) to alert them of an inferred safety concern that may impact the client device or client.

FIG. 7 illustrates a process 700 for monitoring performance indications of a regularly conducted real-time communication session to facilitate inferring a safety concern that impacts a client device or client (i.e. PAH or SAH) associated with a client account. In some examples, a safety concern may be inferred based on non-performance or an irregular performance of a regularly conducted real-time communication session.

At 702, the SSC system may access a client data model associated with a client device, or a client (i.e. PAH or SAH) of a client account. The client data model is intended to provide a baseline client profile of nominal, non-threatening and safe, real-time communications. The SSC system may generate data-points within the client data model that define nominal conditions for regularly conducted real-time communication sessions, based on historical instances of regularly conducted real-time communication sessions.

At 704, the SSC system may analyze the client data model to identify regularly conducted real-time communication sessions. For example, the client data model may include data points that indicate that the client device, or client, may regularly reach out to a particular third-party at a particular time of day, a day of the week, geographic location, or any combination thereof.

At 706, the SSC system may monitor a client device associated with the client for performance indications that correspond to the regularly conducted real-time communication session. Performance indications may include a regular performance of the real-time communication session, irregular performance of the real-time communication session, and non-performance of the real-time communication session.

At 708, the SSC system may determine whether the performance indications correspond to an irregular performance or a non-performance of the real-time communication session. A performance irregularity may be based on a change in the time of day, a day of the week, a geographic location of the client device, or duration of the real-time communication session.

At 710, the SSC system may determine that the performance indications correspond to an irregular performance or a non-performance of the real-time communication session. In doing so, the SSC system may generate a subscriber safety score for non-performance of the regularly conducted safety score that is greater than or equal to a predetermined threshold. The SSC system may further transmit a notification to one or more trusted person(s) to alert them of an inferred safety concern that may impact the client device or client.

In the event that the SSC system determines that the performance indications correspond to a regular performance, process 700 may return to step 706, and the SSC system may continue to monitor the client device.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. One or more non-transitory computer-readable media storing computer-executable instructions, that when executed on one or more processors, cause the one or more processors to perform acts comprising:
    analyzing a client data model to infer that a regularly conducted communication session is to be performed via a client device associated with a client account;
    monitoring the client device to identify performance indicators associated with an occurrence of the regularly conducted communication session;
    inferring whether the regularly conducted communication session occurred, based at least in part on the performance indicators;
    generating a subscriber safety score that is associated with the client device, based at least in part on the performance indicators and the occurrence of the regularly conducted communication session;
    identifying, via one or more distribution rules, a trusted device associated with the client account to receive notification data associated with the client account, based at least in part on the subscriber safety score and a relative proximity of the client device to the trusted device; and
    transmitting the notification data to the trusted device.

2. The one or more non-transitory computer-readable media of claim 1, further storing instructions that, when executed cause the one or more processors to perform acts comprising:
    retrieving, from a data store, historical instances of regularly conducted communication sessions performed via the client device; and
    generating the client data model that is associated with the client device, based at least in part on the historical instances of regularly conducted communication sessions, the client data model providing a baseline of nominal, non-threatening communication sessions.

3. The one or more non-transitory computer-readable media of claim 1, further storing instructions that, when executed cause the one or more processors to perform acts comprising:
identifying performance indicators associated with the client device, based at least in part on the client data model.

4. The one or more non-transitory computer-readable media of claim 1, wherein the performance indicators include an indication of an irregular performance of the regularly conducted communication session, the irregular performance being based at least in part on a time of day, a day of week, or a duration of the regularly conducted communication session.

5. The one or more non-transitory computer-readable media of claim 1, wherein the performance indicators include an indication of a non-performance of the regularly conducted communication session.

6. The one or more non-transitory computer-readable media of claim 1, wherein the performance indicators include an indication of a geolocation associated with the occurrence of the regularly conducted communication session.

7. The one or more non-transitory computer-readable media of claim 1, further storing instructions that, when executed cause the one or more processors to perform acts comprising:
inferring the occurrence of the regularly conducted communication session based at least in part on one of a time of day, day of week, or a geographic location of the client device.

8. The one or more non-transitory computer-readable media of claim 1, further storing instructions that, when executed cause the one or more processors to perform acts comprising:
retrieving from the client device, sensor data associated with environmental conditions that surround the client device, and
wherein, the performance indicators are further based at least in part on an indication of ambient conditions associated with the regularly conducted communication session, the ambient conditions including one or more of an ambient noise, an ambient temperature, or an ambient humidity.

9. The one or more non-transitory computer-readable media of claim 1, further storing instructions that, when executed cause the one or more processors to perform acts comprising:
generating client profile data associated with the client account, the client profile data including a voice biometric template of a client associated with the client account, and
wherein, the performance indicators are further based at least in part on the voice biometric template.

10. The one or more non-transitory computer-readable media of claim 1, further storing instructions that, when executed cause the one or more processors to perform acts comprising:
determining that the subscriber safety score is greater than a predetermined safety threshold, and
wherein, the notification data includes computer-executable instructions that present an alert on a display of the trusted device, the alert indicating that a safety concern associated with the client device.

11. A computer-implemented method, comprising:
under control of one or more processors:
receiving, from a client device associated with a client account, session metadata associated with a real-time communication session between the client device and a third-party device;
retrieving, from a data store, client profile data associated with the client account;
identifying performance indicators associated with regularly conducted communication sessions, based at least in part on the client profile data, the performance indicators including indications of nominal environmental ambient conditions that include at least one of ambient noise, ambient temperature, or ambient humidity;
inferring whether the performance indicators indicate a safety concern associated with an occurrence of the regularly conducted communication session;
generating a subscriber safety score that is associated with the client device, based at least in part on the performance indicators; and
in response to the subscriber safety score being greater than a predetermined safety threshold, transmitting notification data to a trusted device associated with the client account.

12. The computer-implemented method of claim 11, further comprising:
retrieving, from a data store, one or more historical communication sessions conducted by the client device over a predetermined time interval; and
generating the client profile data based at least in part on historical session metadata associated with the one or more historical communication sessions, the historical session metadata including an indication of a time of day, a day of week, or a geolocation of the client device when the historical communication sessions occurred.

13. The computer-implemented method of claim 11, further comprising:
generating a client data model, based at least in part on the client profile data, the client data model providing a baseline of nominal, non-threatening communication sessions,
wherein, inferring whether the performance indicators indicate the occurrence of the regularly conducted communication session is based at least in part on analysis of the client data model.

14. The computer-implemented method of claim 11, wherein the performance indicators include an indication of an irregular performance of the regularly conducted communication session, the irregular performance being based at least in part on a time of day, a day of week, or a duration of the regularly conducted communication session.

15. The computer-implemented method of claim 11, wherein inferring the occurrence of the regularly conducted communication session based at least in part on one of a time of day, day of week, or a geographic location of the client device.

16. The computer-implemented method of claim 11, further comprising:
generating computer-executable instructions that present an alert on a display of the trusted device, the alert indicating that a safety concern associated with the client device, and
wherein, the notification data includes the computer-executable instructions.

17. A system, comprising:
one or more processors;
a memory coupled to the one or more processors, the memory including one or more modules that are executable by the one or more processors to:
analyze client profile data to infer whether a regularly conducted communication session is to be performed via a client device associated with a client account;
monitor the client device to identify performance indicators associated with an occurrence of the regularly conducted communication session;
generate a subscriber safety score that is associated with the client device, based at least in part on the occurrence of the regularly conducted communication session;
identify, via one or more distribution rules, a trusted device to receive notification data associated with the client account, based at least in part on the subscriber score being greater than a predetermined safety threshold and a relative proximity of the client device to the trusted device; and
transmit the notification data to the trusted device.

18. The system of claim 17, wherein the one or more modules are further executable by the one or more processors to:
generate client data model that is associated with the client device, based at least in part on the client profile data, the client profile data including historical instances of regularly conducted communication sessions;
analyze the client data model to identify the performance indicators associated with the occurrence of the regularly conducted communion session; and
infer the occurrence of the regularly conducted communication session based at least in part on analysis of the client data model.

19. The system of claim 17, wherein the performance indicators an indication of an irregular performance of the regularly conducted communication session, the irregular performance being based at least in part on a time of day, a day of week, or a duration of the regularly conducted communication session.

20. The system of claim 17, wherein the performance indicators include at least one of a first indication of a non-performance of the regularly conducted communication session, or a second indication a geolocation associated with the occurrence of the regularly conducted communication session.

* * * * *